United States Patent
Rodrigues

(10) Patent No.: US 11,663,730 B2
(45) Date of Patent: May 30, 2023

(54) SYSTEMS AND METHODS FOR AN IMPROVED CAMERA SYSTEM USING A GRADED LENS AND FILTERS TO ESTIMATE DEPTH

(71) Applicant: Toyota Motor Engineering & Manufacturing North America, Inc., Plano, TX (US)

(72) Inventor: Sean P. Rodrigues, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 93 days.

(21) Appl. No.: 17/179,762

(22) Filed: Feb. 19, 2021

(65) Prior Publication Data

US 2022/0270278 A1    Aug. 25, 2022

(51) Int. Cl.
| | |
|---|---|
| G06T 7/00 | (2017.01) |
| G06T 7/557 | (2017.01) |
| G02B 1/00 | (2006.01) |
| G02B 3/00 | (2006.01) |
| H04N 23/80 | (2023.01) |

(52) U.S. Cl.
CPC ............ G06T 7/557 (2017.01); G02B 1/005 (2013.01); G02B 3/0087 (2013.01); H04N 23/80 (2023.01); G06T 2207/30252 (2013.01)

(58) Field of Classification Search
CPC .......... G06T 7/557; G06T 2207/30252; G02B 1/005; G02B 3/0087; H04N 5/23229
See application file for complete search history.

(56) References Cited

U.S. PATENT DOCUMENTS

| | | | |
|---|---|---|---|
| 5,793,985 A | * | 8/1998 | Natarajan ............... H04N 19/51 375/240.18 |
| 8,830,556 B2 | | 9/2014 | Smith et al. |
| 9,448,460 B2 | | 9/2016 | Shen et al. |
| | | | (Continued) |

FOREIGN PATENT DOCUMENTS

| | | |
|---|---|---|
| WO | 2019048200 A1 | 3/2019 |
| WO | 2019075335 A1 | 4/2019 |
| WO | 2020002164 A1 | 1/2020 |

OTHER PUBLICATIONS

Lin et al., Achromatic metalens array for full-colour light-field imaging, 14 Nature Nanotechnology Mar. 2019.*

(Continued)

*Primary Examiner* — Frank F Huang
(74) *Attorney, Agent, or Firm* — Christopher G. Darrow; Darrow Mustafa PC

(57) ABSTRACT

System, methods, and other embodiments described herein relate to an improved camera system including directional optics to estimate the depth of grayscale and color images. In one embodiment, a camera system includes a graded lens to receive light associated with a scene and resolve multiple angles of the light according to parameters of the graded lens. The camera system also includes a detector that senses the light from the graded lens per pixel to integrate multiple views of the scene into a single image to estimate depth associated with objects and the single image includes data for views of the objects that overlap having resolved angles in association with the parameters.

20 Claims, 7 Drawing Sheets

(56) References Cited

U.S. PATENT DOCUMENTS

| | | | |
|---|---|---|---|
| 10,437,012 B1* | 10/2019 | Gurin | B60R 1/00 |
| 10,634,557 B2 | 4/2020 | Khorasaninejad et al. | |
| 2006/0088211 A1* | 4/2006 | Kusakabe | G06T 5/002 |
| | | | 382/167 |
| 2007/0183675 A1* | 8/2007 | Morohashi | H04N 19/154 |
| | | | 375/E7.19 |
| 2008/0123738 A1* | 5/2008 | Katsavounidis | H04N 19/142 |
| | | | 375/E7.17 |
| 2009/0003714 A1* | 1/2009 | Subramaniam | H04N 19/426 |
| | | | 375/E7.184 |
| 2009/0034616 A1* | 2/2009 | Abe | G06T 9/004 |
| | | | 375/E7.076 |
| 2009/0125291 A1* | 5/2009 | Mohandas | G06T 7/00 |
| | | | 703/13 |
| 2010/0034480 A1* | 2/2010 | Rao | G06T 5/20 |
| | | | 382/261 |
| 2012/0128244 A1* | 5/2012 | Singh | G06T 5/20 |
| | | | 382/167 |
| 2017/0082263 A1 | 3/2017 | Byrnes et al. | |
| 2019/0006743 A1 | 1/2019 | Kirino et al. | |
| 2020/0160598 A1 | 5/2020 | Manivasagam et al. | |
| 2020/0210726 A1 | 7/2020 | Yang et al. | |
| 2020/0225386 A1 | 7/2020 | Tsai et al. | |

OTHER PUBLICATIONS

Wang et al., Pseudo-lidar from visual depth estimation: Bridging the gap in 3D object detection for autonomous driving, Proceedings of the IEEE Computer Society Conference on Computer Vision and Pattern Recognition, pp. 3445-8453, 2019.

You et al., "Pseudo-LiDAR++: Accurate Depth for 3D Object Detection in Autonomous Driving," ICLR, pp. 1-22, arXiv:1906.06310v3 [cs.CV] Feb. 15, 2020.

Kyle Field, "Tesla Achieved the Accuracy of Lidar With Its Advanced Computer Vision Tech," pp. 1-4, Aug. 3, 2020.

Kang et al., "Electrifying photonic metamaterials for tunable nonlinear optics," Nature Communications, Article No. 4680, pp. 1-7, Aug. 2014.

Liang et al., "Free-standing plasmonic metal-dielectric-metal bandpass filter with high transmission efficiency," Scientific Reports, Article No. 4357, pp. 1-8, Jun. 28, 2017.

Sinha et al., "Depth Estimation by Learning Triangulation and Densification of Sparse Points for Multi-view Stereo," pp. 1-22, arXiv:2003.08933v1 [cs.CV] Mar. 19, 2020.

Ding et al., "Learning Depth-Guided Convolutions for Monocular 3D Object Detection," pp. 1-12, arXiv:1912.04799v2 [csCV] Dec. 13, 2019.

Nakamura et al., "Real-time monocular ranging by Bayesian triangulation," 2013 IEEE Intelligent Vehicles Symposium (IV) pp. 1368-1373, Jun. 2013, Gold Coast, Australia.

Weng et al., "Monocular 3D Object Detection with Pseudo-LiDAR Point Cloud," Proceedings of the IEEE/CVF International Conference on Computer Vision, pp. 1-10, Mar. 2019.

Chen et al., "DSGN: Deep Stereo Geometry Network for 3D Object Detection," IEEE/CVF Conference on Computer Mision and Pattern Recognition (CVPR), 2020, pp. 12536-12545.

Wang et al., "Flow-Motion and Depth Network for Monocular Stereo and Beyond," IEEE Robotics and Automation Letters, vol. 5, No. 2, pp. 3307-3314, Apr. 2020.

Qin et al., "Triangulation Learning Network From Monocular to Stereo 3D Object Detection," 2019 IEEE/CVF Conference on Computer Vision and Pattern Recognition, Long Beach, CA, USA, 2019, pp. 7607-7615.

Munguia et al., "A Robust Approach for a Filter-Based Monocular Simultaneous Localization and Mapping (SLAM) System," Sensors 2013, 13, pp. 8501-8522.

Kogos et al., "Plasmonic ommatidia for lensless compound-eye vision," Nat Commun 11, 1637, pp. 1-9, 2020.

Lan et al., "Metasurfaces for Near-Eye Augmented Reality," ACS Photonics 2019, 6 (4), pp. 1-23.

Khorasaninejad et al., "Metalenses at visible wavelengths: Diffraction-limited focusing and subwavelength resolution imaging," Science, vol. 352, issue 6290, pp. 1190-1194, Jun. 2016.

Arbabi et al., "Miniature optical planar camera based on a wide-angle metasurface doublet corrected for monochromatic aberrations," Nat Commun 7, 13682, pp. 109, 2016.

Kamali et al., "A review of dielectric optical metasurfaces for wavefront control," Nanophotonics 2018; 7(6), pp. 1041-1068.

Zou et al., "Imaging based on metalenses," PhotoniX 1, 2, pp. 1-24, 2020.

Khorasaninejad et al., "Super-Dispersive Off-Axis Meta-Lenses for Compact High Resolution Spectroscopy," Nano Lett 2016, 16, pp. 3732-3737.

Adams et al., "Perfect compensation of absorption in metamaterials for diffraction-unlimited imaging," 7th International Conference on Metamaterials, Photonic Crystals and Plasmonics 2016, Non-Hermitian engineering in photonics, plasmonics and metamaterial, 2 pages, Jul. 2016, Malaga, Spain.

Bayati et al., "Inverse designed metalenses with extended depth of focus," ACS Photonics 2020, 7, 4, 873-878.

Phare et al., "Silicon Optical Phased Array with High-Efficiency Beam Formation over 180 Degree Field of View," pp. 1-12, 2018.

Li et al., "Metalens-Based Miniaturized Optical Systems," Micromachines 2019, 10, pp. 1-21.

Shalaginov et al., "A single-layer panoramic metalens with > 170° C. diffraction-limited field of view," pp. 1-14, 2019.

\* cited by examiner

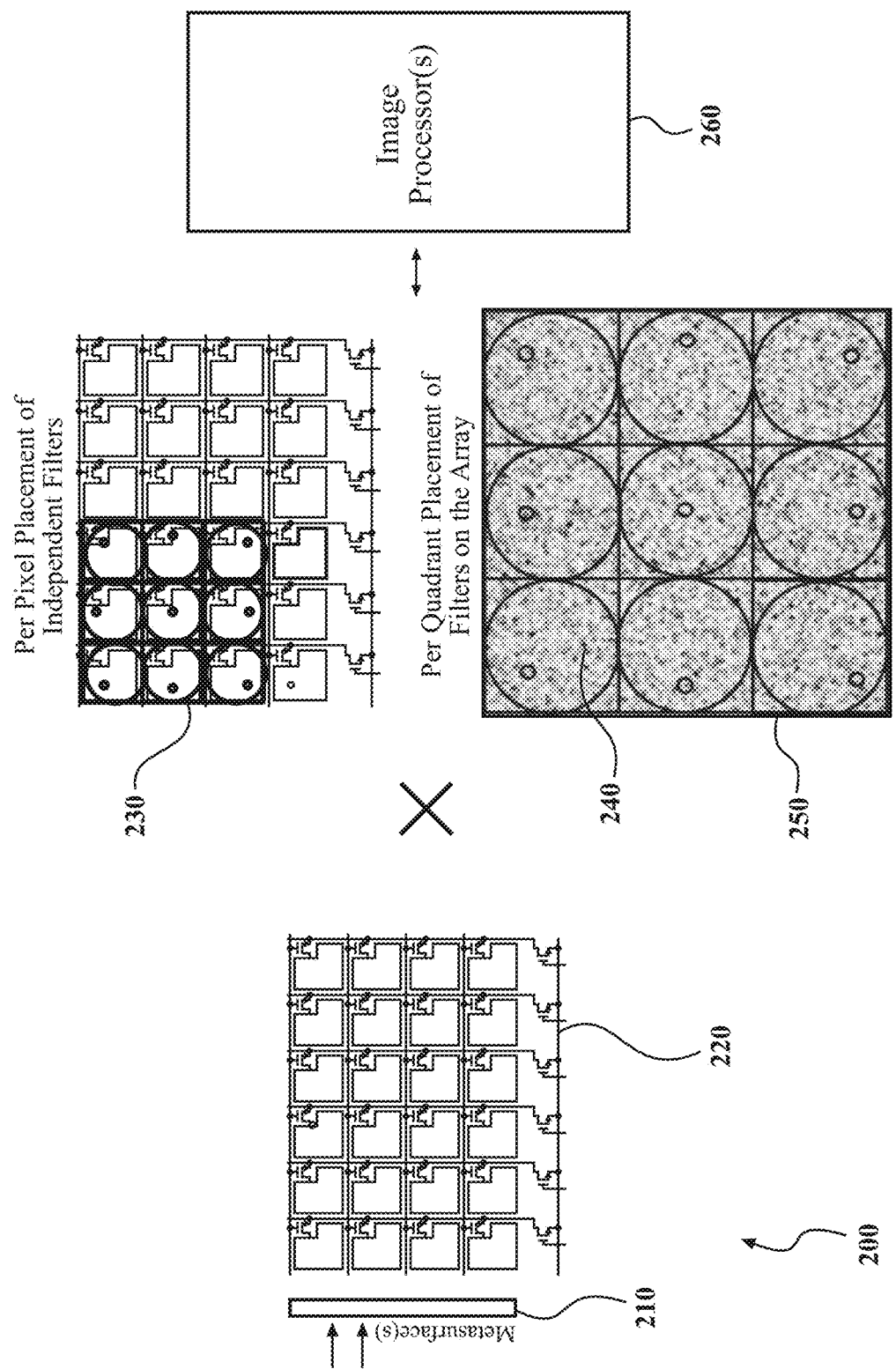

SYSTEMS AND METHODS FOR AN IMPROVED CAMERA SYSTEM USING A GRADED LENS AND FILTERS TO ESTIMATE DEPTH

TECHNICAL FIELD

The subject matter described herein relates, in general, to a camera system, and, more particularly, to an improved camera system including directional optics to estimate the depth of grayscale and color images.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect the presence of objects and other features of a scene. In further examples, additional/alternative sensors such as camera systems may be implemented to acquire information about the surrounding environment from which a system derives awareness about aspects of the surrounding environment. This sensor data can be useful in various circumstances for improving perceptions of the surrounding environment so that systems such as automated driving systems can perceive the noted aspects and accurately plan and navigate accordingly.

In general, the further awareness is developed by the vehicle about a surrounding environment, the better a driver can be supplemented with information to assist in driving and/or the better an autonomous system can control the vehicle to avoid hazards. A system using LIDAR for object detection is optimal for long ranges. Therefore, a vehicle may use a pseudo-lidar system to detect objects using an image(s) processed by a system using multiple cameras and sensors for short and long ranges. However, pseudo-lidar systems may be computationally intensive particularly when using multiple cameras and sensors causing frustration.

Moreover, a pseudo-lidar system may take images from multiple cameras. A vehicle, camera, or object in motion may cause distortion to the images taken from multiple cameras. A pseudo-lidar system may resolve images from multiple cameras using a machine process to search for image overlap. For instance, an image overlap may be a stereo-pair having two or more images that share a corresponding image point. However, a pseudo-lidar system searching for image overlap is time-consuming and computationally intensive.

SUMMARY

In one embodiment, example systems and methods relate to a manner of improving pseudo-light detection and ranging (LIDAR) detection using a camera system including directional optics to estimate depth. In various implementations, pseudo-lidar systems are computationally intensive at accurately detecting objects in a scene when combining data from multiple sensors or cameras with image data. Furthermore, pseudo-lidar hardware using multiple sensors may increase the size of components, processing tasks, and delays to estimate depth. Accordingly, pseudo-lidar systems may encounter difficulties for efficiently and accurately estimating depth causing frustration. Therefore, in one embodiment, a camera system reduces computation to estimate the depth of a scene using purpose-built hardware, physical filters, and limited sensor inputs to resolve angles of a lightwave(s) associated with an object. The camera system may resolve angles of a lightwave(s) according to parameters of a flat graded lens optimized to estimate the depth. The camera system may redirect a lightwave(s) associated with a scene per section of a detector array to improve objection detection. The output(s) of the camera system may be image(s) data at a wide field-of-view due to combining redundant information of a scene. In one approach, the output(s) may be a pattern including the object that simplifies and improves subsequent tasks for estimating depth.

Moreover, the camera system may use the graded lens per pixel of a detector to resolve particular angles of lightwaves by integration for subsequently estimating depth. In one approach, the camera system may use the detector to resolve angles of a lightwave(s) by reducing image resolution. The camera system may redirect a lightwave(s) associated with the reduced resolution image per pixel of the detector to improve objection detection. The output(s) of the camera system may be an image(s) combined to form a pattern that simplifies subsequent tasks to estimate depth.

In addition, the camera system may use the graded lens to perform filtering of light associated with objects by dividing the detector into areas or quadrants to resolve particular angles of lightwaves for subsequently estimating depth. A vehicle may be equipped with a camera system using per pixel or quadrant filtering according to efficiency or performance requirements. For example, the camera system may use per quadrant filtering with a detector divided such that one quadrant has a different focus area to resolve an angle(s) of lightwaves associated with a scene. The output(s) of the camera system may be an image(s) in a pattern that simplifies subsequent tasks to estimate depth.

In one embodiment, a camera system including directional optics to estimate the depth of grayscale and color images is disclosed. The camera system includes a graded lens to receive light associated with a scene and resolve multiple angles of the light according to parameters of the graded lens. The camera system also includes a detector that senses the light from the graded lens per pixel to integrate multiple views of the scene into a single image to estimate depth associated with objects and the single image includes data for views of the objects that overlap having resolved angles in association with the parameters.

In another embodiment, a camera system including directional optics to estimate the depth of grayscale and color images is disclosed. The camera system includes a graded lens to receive lightwaves associated with a scene and resolve multiple angles of the lightwaves according to parameters of the graded lens. The camera system also includes a detector array that senses the lightwaves from the graded lens per area of the scene to combine multiple views to estimate depth associated with objects and the combined multiple views include data for views of the objects that overlap having resolved angles in association with the parameters.

In another embodiment, a camera system including directional optics to estimate the depth of grayscale and color images is disclosed. The camera system includes a graded lens to receive light associated with a scene and resolve multiple angles of the light according to parameters of the graded lens. The camera system also includes a pixel area that senses the light from the graded lens to integrate multiple views of the scene into a single image to estimate depth associated with objects and the single image includes data for elements of the multiple views that overlap in association with the objects having resolved angles.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 2A-2C illustrate various embodiments of camera systems using filters to estimate depth associated with an object in a scene and an output(s) of the camera systems.

DETAILED DESCRIPTION

Figure 1:
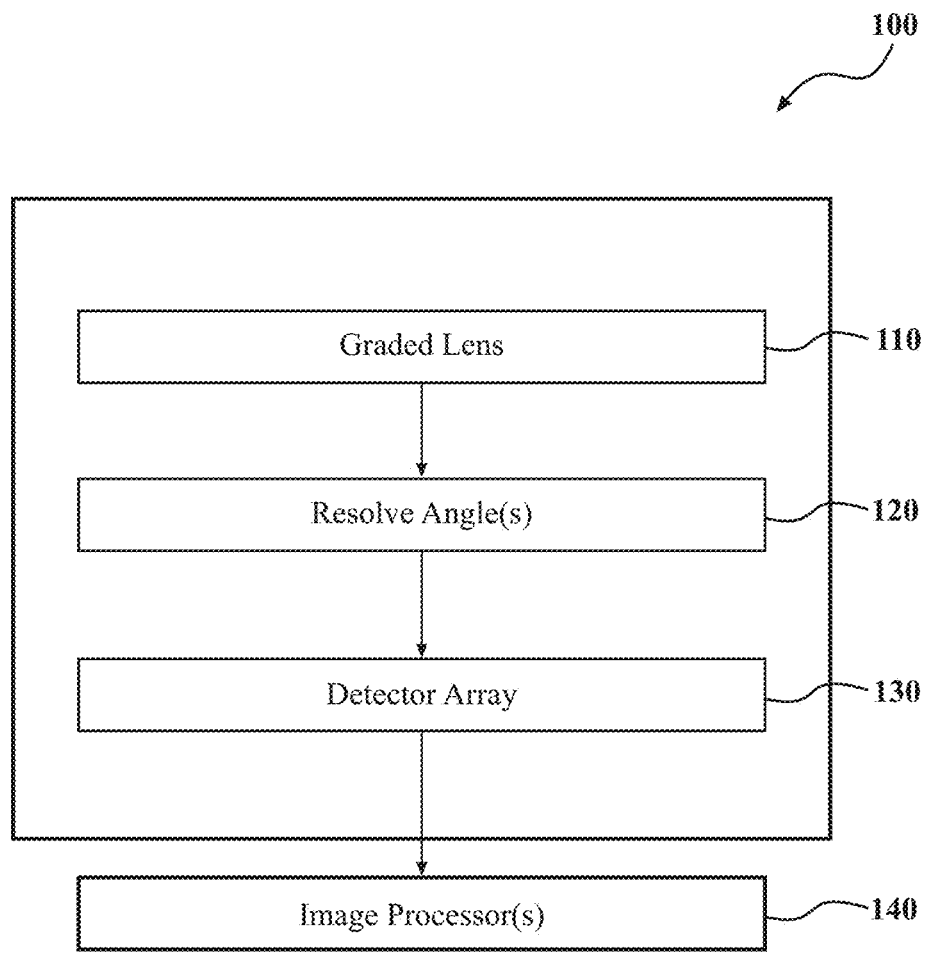
FIG. 1 illustrates one embodiment of a camera system using filters to estimate the depth associated with an object in a scene.

Systems, methods, and other embodiments associated with improving a camera system using directional optics and physical filters to estimate depth are disclosed herein. The camera system may improve image detection of an object from multiple views by optically resolving an angle of light captured, in grayscale or color, using a graded lens. The graded lens may be a metasurface providing a substantially flat profile for closer proximity to a detector, reducing image distortion. The camera system may resolve angles of a lightwave(s) according to parameters of properties associated with the graded lens optimized to estimate depth by adapting to planarization effects. For example, the parameters may define an amount of refraction or directing of a lightwave(s) at a particular intensity. The camera system may also optically remove unwanted parallelism according to the parameters, thereby improving light capture before further processing.

Furthermore, the output(s) of the camera system may be feature rich image data that is readily parsed by a machine or image processor. The camera system may use the image data to produce a spatial point distribution for improved estimation of depth due to combined views of a scene from the physical filters. The spatial point distribution may be similar to representations generated by LIDAR systems to estimate depth generated with less complexity thereby improving implementations.

For color-based capture, the camera system may filter using a graded lens and process by color wavelength for detection per section. In one approach, the camera system using per pixel filtering may have independent filters on a pixel to resolve the angles of a lightwave(s). Image detection is improved using per pixel filtering by resolving angles and combining views on an individual pixel basis rather than whole images by integrating portions of views in a scene.

Similar to per pixel filtering, a camera system may use a graded lens to process a scene using a detector divided into areas to resolve particular angles of lightwaves for subsequently estimating depth associated with an object. For example, a camera system uses a quadrant filter of X by X dimensions in size according to the number of quadrants arranged for a detector. In one approach, a camera system may use different size apertures for one quadrant allowing capture of various levels of light per quadrant rather than individual pixels. In this way, the camera system may reduce processing tasks by capturing an image according to a group of pixels rather than individual pixels.

Furthermore, a camera system may perform filtering using a graded metalens, metamaterials, or metasurfaces manufactured using electron-beam lithography, roll-to-roll printing, photolithography, and so on. A graded metasurface provides a substantially flat profile for denser use in an array of lenses, thereby reducing image distortion. The transmission profile of metasurfaces may include a desired region of light for transmission to a pixel or area in an angle range. In this way, a camera system detects an image from multiple views with an improved accuracy and reduced complexity using metasurfaces and per section filtering for estimating depth.

FIG. 1 illustrates one embodiment of a camera system 100 using filters to estimate depth associated with an object in a scene. The camera system 100 may be incorporated in a vehicle for detecting hazardous objects or obstacles in the field-of-view. However, in various implementations given herein, the camera system 100 may be used in any one of a vehicle, a security system, a traffic system, a municipal monitoring system, a mobile device, simultaneous localization and mapping robotics, camera tracking, a structure from motion, projective geometry, multi-view stereo for volumetric methods, and so on for multi-perspective imaging using a single camera system. In one approach, an automated driving system (ADS) may process the output(s) from the camera system to estimate depth, thereby avoiding the objects or obstacles. The camera system may be a single camera unit or multiple camera units that capture images of the same object in a scene from different or overlapping views. In the camera system 100, a graded lens 110 may receive a lightwave(s) associated with one or more objects in a field-of-view. A lens may be a single lens or a lens system. A lens system can include two or more optical elements in conjunction with one or more apertures or focal points. An aperture is a hole or opening that allows or limits light for detection and defines a cone angle for rays that focus in the image plane. For example, an aperture may include irises or pupils.

Furthermore, the angle resolution component 120, in one approach, may resolve an angle of the lightwave(s) and improve image detection. For example, the angle resolution component 120 may transmit the lightwave(s) or photons at 15-30 degrees from the z-axis to the detector array 130. However, in the examples given herein the camera system may also transmit the lightwave(s) or photons at 1-45 degrees from normal. The angle resolution component 120 may use per section, per pixel, or per area filtering. As further explained herein, the filtering may use metasurfaces that reduce distortion resulting from close placement near the detector array 130.

In per pixel filtering, the camera system 100 uses pixel-level placement of independent filters to resolve the angles of a lightwave(s) for pixels individually. The size of an independent filter may match the size of a pixel of the detector array 130. In this approach, the camera system 100 improves image capture using per pixel filtering by resolving an angle(s) of light individually rather than by the area of a detector array.

In per area filtering, the camera system 100 may divide a detector array into a plurality of areas, such as quadrants, where an area represents a different focus area, view, or offset of a scene or image. A vehicle may be equipped with a camera system using per pixel or per area filtering according to efficiency or quality requirements. For example, the camera system improves image detection using per quadrant filtering by resolving an angle(s) of light associated with multiple views of a scene efficiently according to sections of a detector array that capture an image rather than by pixel. Although a quadrant may be used in the examples herein, a camera system may use any area size to resolve angles of a lightwave(s) by filtering. Furthermore, the image processor(s) 140 may process the output(s) of the detector array 130 of an image(s) to having a pattern that includes the objects for subsequent tasks to estimate depth.

Figure 2B:
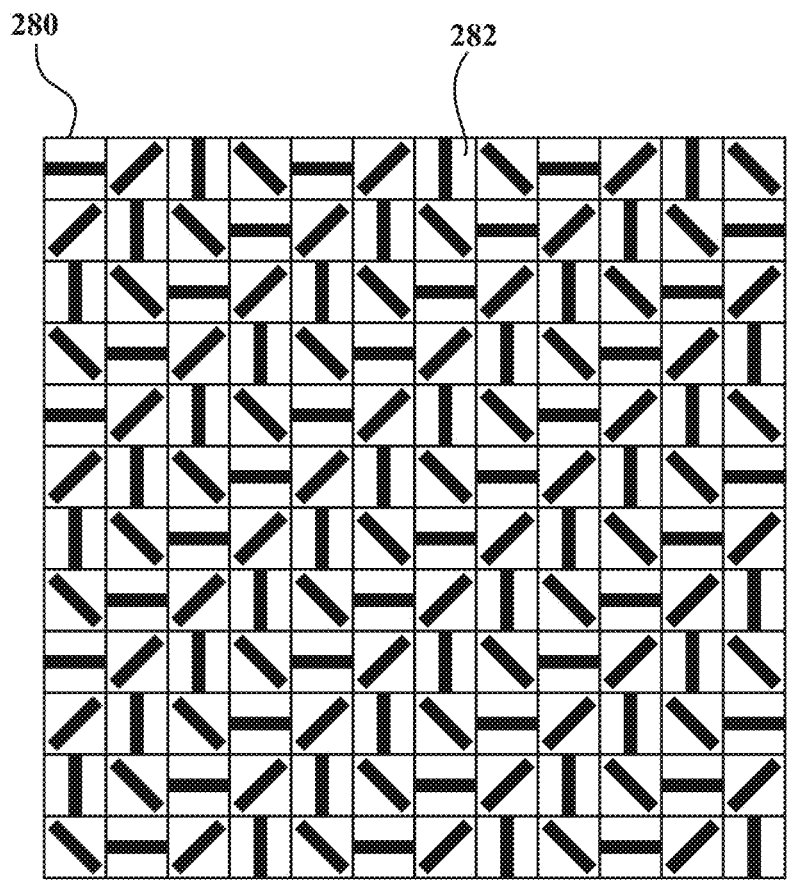
Figure 2C:
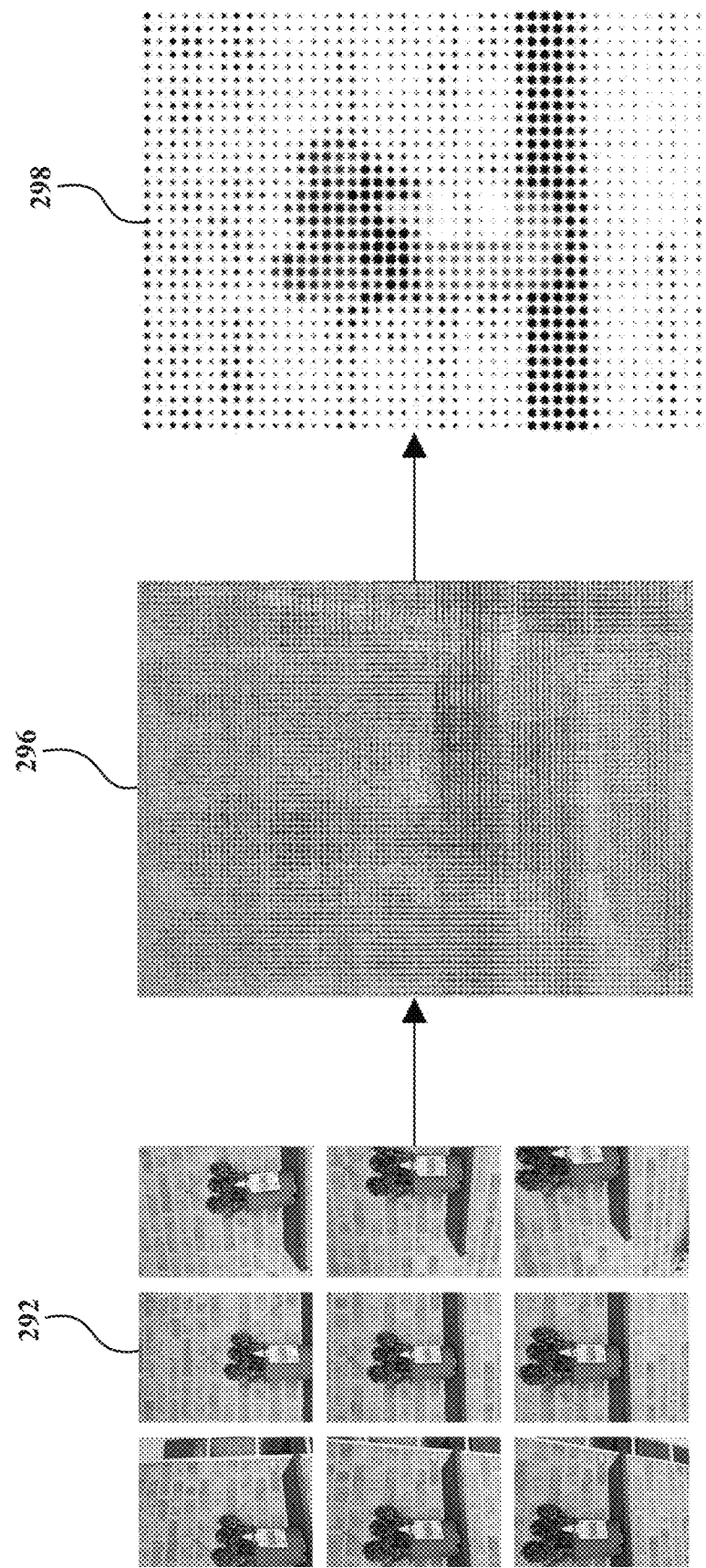

FIGS. 2A-2C illustrates various embodiments of camera systems using filters to estimate depth associated with an object in a scene and an output(s) of the camera systems. In FIG. 2A, a camera system 200 includes the metasurface(s) 210 that may be a graded lens, a graded optical lens, and so on that receives and directs light associated with a scene to the detector array 220. The metasurface(s) 210 may undo parallel effects, such as by filtering, of the k-vector of a lightwave(s). A metasurface lens may be configured in the camera system 200 to allow close placement to the detector array 220, thereby reducing system size and distortion.

The detector array 220 may be composed of a plurality or group of pixels. In one approach, the metasurface(s) 210 may be a photonic band-gap crystal. Furthermore, the metasurface(s) 210 and the detector array 220 may be operatively connected. The term "operatively connected," as used throughout this description, can include direct or indirect connections, including connections without direct physical contact.

In one approach, the metasurface(s) 210 may provide per pixel or quadrant filtering to resolve an angle of a lightwave(s) to detect an image(s). Although a quadrant may be used in the examples herein, a camera system may use any area size to resolve angles of a lightwave(s) by filtering. As explained herein, a vehicle may be equipped with a camera system using per pixel or quadrant filtering according to efficiency or quality requirements. A camera system may resolve angles of a lightwave(s) since a lightwave(s) takes the form of a plane wave for capture by the detector array 220. The metasurface(s) 210 may undo planarization of the plane wavefront and thereby improve image detection to estimate depth.

Moreover, a proximal distance of the metasurface(s) 210 and another filter(s) to resolve an angle may result in minimal distortion of the image(s) due to the substantially flat profile of metasurfaces. The lightwave(s) that passes through a filter provides an image for improved detection or capture. For example, the metasurface(s) 210 may transmit a lightwave(s) or a photon(s) at 15-30 degrees from the z-axis to a single-pixel, according to the per pixel filter 230 placement, thereby resolving an angle of received light. The camera system 200 uses the placement of independent filters on a pixel to resolve the angles of a lightwave(s) individually. In this way, a camera system resolves angles of a lightwave(s) at a pixel level to improve quality.

In one approach, the size of an independent filter may match the size of a pixel of the detector array 220. The camera system 200 improves image capture using per pixel filtering by resolving an angle(s) of light from multiple perspectives individually rather than by the area of a detector. In this way, a single-pixel of the detector array 220 has a resolved angle of the lightwave(s) to output to the image processor(s) 260 generating an image from multiple views.

In addition, a graded lens metasurface(s) 210 may function as an imaging lens to capture and resolve an image 15 degrees off-axis to the normal plane of the detector. For per pixel capture, a lens of the metasurface(s) 210 grade may be broken up and subdivided across the entire surface of the detector array 220 according to quality requirements. Furthermore, the camera system 200 may use per quadrant filtering by dividing the detector array 130 into areas that represent a group of pixels. For example, nine areas can be used that correlate to nine different focus areas of a scene.

For per area filtering, the metasurface(s) 210 may filter and capture the light using two or more pixels. An area of two or more pixels may represent a different focus area, view, or offset of a scene. In one approach, a camera system may use a quadrant filter of X by X dimensions, where X is the pixel size for a single filter. The filter 250 on the detector or pixel area 240 may include a number of quadrants, divisions, zones, and so on. In one approach, different size apertures may be used for each quadrant allowing capture of various levels of light rather than individual pixels. The camera system captures multiple perspectives and reduces processing tasks using per quadrant filtering for an angle(s) of light efficiently according to areas of a detector rather than per pixel capture. However, a camera system may produce a different quality estimation of depth using per pixel processing.

FIG. 2B illustrates that a metasurface(s) 280 functioning as a lens for a given wavelength of light by manipulating phase. A unit cell 282 of metasurface 280 is tuned for per pixel or area (e.g. quadrant) filtering to resolve angles of light to improve the estimation of depth. The unit cell 282 may contain one or more nanostructures elements, shown as rectangles, to direct a lightwave(s) and control the optical phase for a lightwave(s). For example, a unit cell may be tuned to operate according to a corresponding grayscale filter or red, green, and blue (RGB) filter such that the metasurface's size or shape will add or subtract the appropriate phase needed to operate at the given wavelength for filtering. Moreover, a graded metasurface lens may be substantially flat. For example, a metasurface can be less than a micron tall. The size of metasurface materials allows denser use on a detector thereby reducing distortion.

FIG. 2C illustrates a system capturing nine images 292 from multiple views of a scene including an object that are offset. Although nine images are illustrated, the system may capture any number of images according to the views present for a scene to estimate depth. As explained further below, a camera system uses directional optics and physical filters to process the nine images 292 and produce image data 296 for efficient image processing. The image data 296 may be rich with features and readily parsed by a machine or image processor. Furthermore, a camera system may use directional optics and physical filters per area, such as quadrants, to obtain an image similar to the nine images 292 without spacing in between the images to improve subsequent tasks for depth estimation.

In one approach, a camera system may use image data 296 and/or triangulation to produce a spatial point distribution or point cloud representation 298 for improved estimation of depth from the nine images 292 representing different views. In one approach, the object in the spatial point distribution or point cloud representation 298 may have a resolution reduced by nine for a more optimal depth due to an increased range of data. Furthermore, the spatial point distribution or point cloud representation 298 may be similar to representations generated by LIDAR systems to estimate depth generated with less complexity using the camera system 200.

A camera system may form a 2D matrix representation of the image data 296. A camera system may also aggregate similar regions of a scene captured in the image data 296 for the estimation of depth. In one approach, the camera system may aggregate data from opposite corners of a scene to reduce offset, thereby improving the estimation of depth. For per pixel capture, the 2D matrix may be (row of pixels)×(column of pixels) that represent the total intensity and angle information of a plurality of multiple captured images (e.g. nine images) from a pixel formed according to directional optics. The 2D matrix may also include color information for color-based capture. In one approach, the 2D matrix may exclude z-component information to reduce processing. For per area processing, such as by quadrant, a 2D matrix may represent multiple captured images (e.g. nine images) by area.

Figure 3:
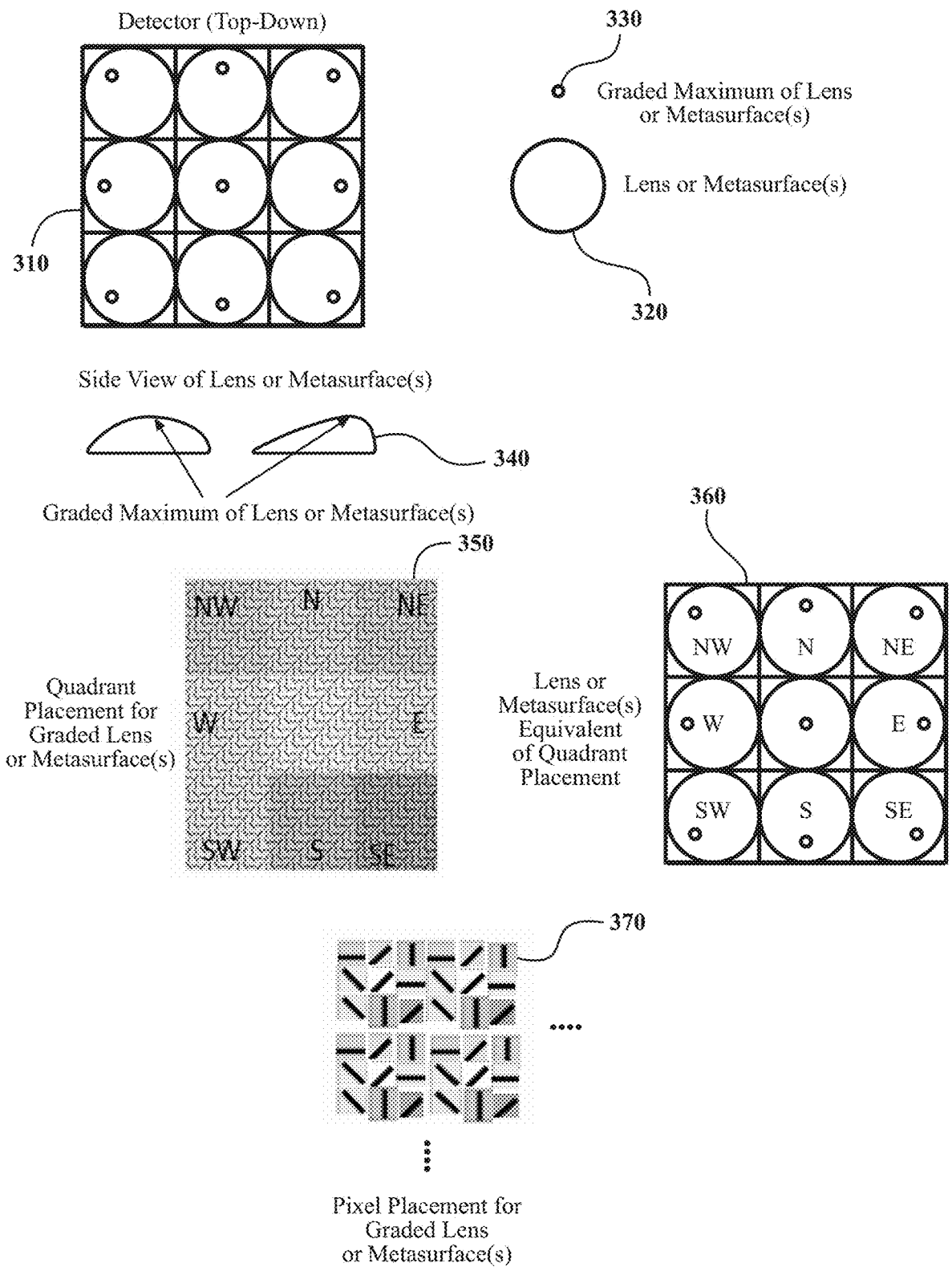
FIG. 3 illustrates one embodiment of filters used by a camera system to resolve angles of a lightwave(s).

FIG. 3 illustrates one embodiment of filters used by a camera system to resolve angles of a lightwave(s). For per pixel filtering, a detector may use a plurality of angle-based filters 310 for filtering. A metasurface(s) or lens 320 may comprise a graded maximum or peak 330 and a plurality of unit cell elements to resolve an angle of a lightwave(s) by refraction and phase alteration. A metasurface(s) may provide a substantially flat profile for denser and proximate use on a detector for reduced image distortion. Metasurfaces may be manufactured, in one approach, using any one of electron-beam lithography, roll-to-roll printing, photolithography, and so on. In one approach, the plurality of angle-based filters 310 may be a graded metasurface lens that a system uses to resolve angles associated with a grayscale image.

A side view of a metasurface(s) or lens 340 shows a graded maximum or peak. For per quadrant filtering, a plurality of angle-based filters 350 may be placed on-chip substantially proximate to a detector according to areas northwest (NW), north (N), northeast (NE), west (W), center, east (E), southwest (SW), south (S), and southeast (SE) to capture different parts of multiple views. For example, an area of angle-based filters 350 may correspond to a plurality or group of pixels for image capture associated with an angle to reduce complexity. Although a quadrant may be used in the examples herein, a camera system may use any area size to resolve the angles of a lightwave(s) by filtering.

As explained herein, a system may filter using per quadrant placement for the graded metasurface and the lens equivalent of per quadrant filtering 360. In quadrant filtering, an area of the filter may be associated with a plurality of filters to reduce complexity and increase efficiency when resolving angles. On the contrary, for per pixel placement 370 a graded metasurface lens may be divided by pixel elements and placed on a detector. In per pixel placement 370, a unit cell is tuned per pixel to resolve angles of light. The unit cell may contain one or more nanostructures elements, shown as rectangles, to modify the optical phase for a lightwave(s). In certain configurations, a camera system using per pixel placement may generate more rich image data to improve the estimation of depth.

Figure 4:
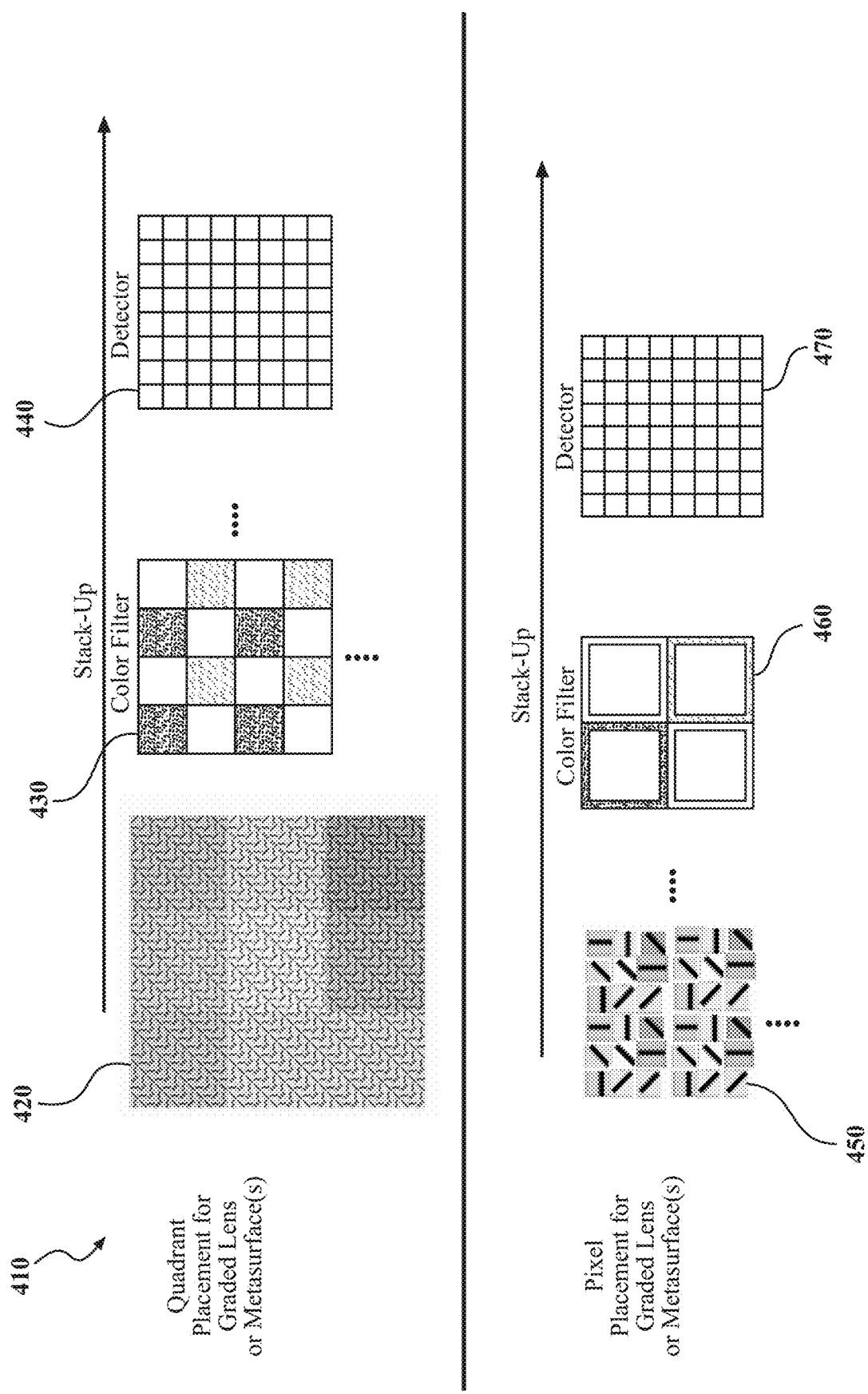
FIG. 4 illustrates one embodiment of camera systems filtering per section to estimate depth associated with an object in a scene.

FIG. 4 illustrates one embodiment of camera systems 410 filtering per section to estimate depth associated with an object in a scene. In a stack, a per quadrant filter 420 may comprise a graded metasurface(s) lens or lens that transmits angle-resolved light for processing a lightwave(s) by color filter 430. A camera system using a graded lens and per quadrant placement for filtering may generate rich image data to improve the estimation of depth without complex processing. In one approach, the color filter 430 may be divided similar to a standard lens to process a lightwave(s). The detector 440 may detect a lightwave(s) angle-resolved according to a wavelength color(s).

In the examples given herein, a color filter may comprise a red filter substantially at 630 nanometers (nm), a green filter substantially at 530 nm, and a blue filter substantially at 400 nm wavelengths. However, a color filter may transmit filtered lightwaves at any wavelength on a color basis to a detector. In one approach, the filters may be Beyer filters that couple with other angle bandpass filters.

Similarly, in another stack a per pixel filter 450 may be used by a graded metasurface lens or lens that transmits angle-resolved light for processing a lightwave(s) by color filter 460. A camera system using a graded lens and per pixel placement for filtering may generate rich image data to improve the estimation of depth without complex processing. In one approach, the color filter 460 may be subdivided into nine lenses to utilize the same color filter, thereby reducing the number of components in the camera system. Lastly, the detector 470 may detect a lightwave(s) angle-resolved according to a wavelength color(s).

Figure 5:
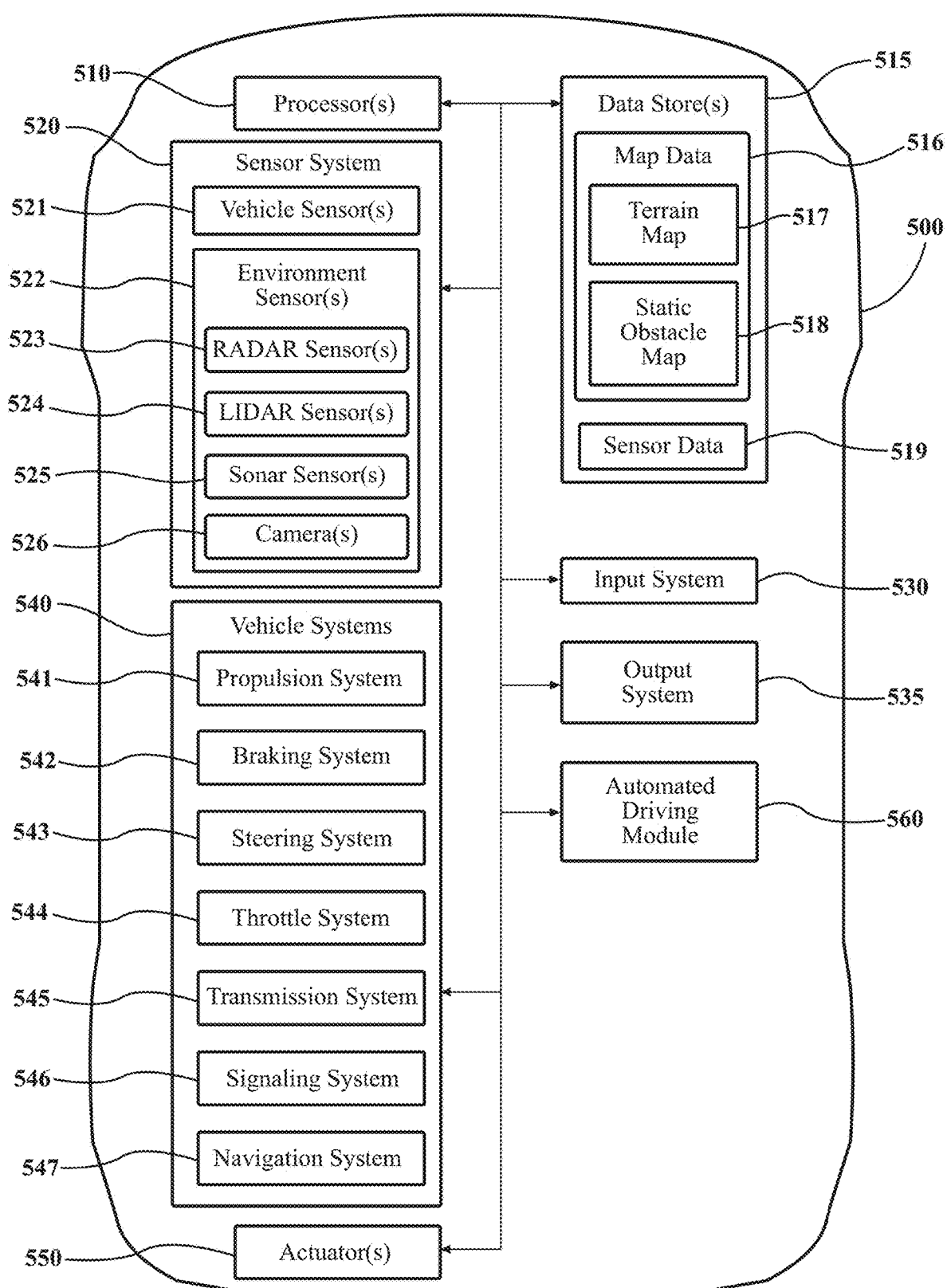
FIG. 5 illustrates one embodiment of a vehicle within which systems and methods disclosed herein may be implemented.

FIG. 5 illustrates one embodiment of a vehicle within which systems and methods disclosed herein may be implemented. As used herein, a "vehicle" is any form of motorized transport. In one or more implementations, the vehicle 500 is an automobile. While arrangements will be described herein with respect to automobiles, it will be understood that embodiments are not limited to automobiles. In some implementations, the vehicle 500 may be any robotic device or form of motorized transport.

The vehicle 500 also includes various elements. It will be understood that in various embodiments, the vehicle 500 may have less than the elements shown in FIG. 5. The vehicle 500 can have any combination of the various elements shown in FIG. 5. Further, the vehicle 500 can have additional elements to those shown in FIG. 5. In some arrangements, the vehicle 500 may be implemented without one or more of the elements shown in FIG. 5. While the various elements are shown as being located within the vehicle 500 in FIG. 5, it will be understood that one or more of these elements can be located external to the vehicle 500.

In some instances, the vehicle 500 is configured to switch selectively between different modes of operation/control according to the direction of one or more modules/systems of the vehicle 500. In one approach, the modes include: 0, no automation; 1, driver assistance; 2, partial automation; 3, conditional automation; 4, high automation; and 5, full automation. In one or more arrangements, the vehicle 500 can be configured to operate in a subset of possible modes.

In one or more embodiments, the vehicle 500 is an automated or autonomous vehicle. As used herein, "automated" or "autonomous vehicle" refers to a vehicle that is capable of operating in an autonomous mode (e.g., category 5, full automation). "Autonomous mode" refers to navigating and/or maneuvering the vehicle 500 along a travel route using one or more computing systems to control the vehicle 500 with minimal or no input from a human driver. In one or more embodiments, the vehicle 500 is highly automated or completely automated. In one embodiment, the vehicle 500 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 500 along a travel route.

The vehicle 500 can include one or more processors 510. In one or more arrangements, the processor(s) 510 can be a main processor of the vehicle 500. For instance, the processor(s) 510 can be an electronic control unit (ECU), an application-specific integrated circuit (ASIC), a microprocessor, etc. The vehicle 500 can include one or more data stores 515 for storing one or more types of data. The data store 515 can include volatile and/or non-volatile memory. Examples of suitable data stores 515 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store 515 can be a component of the processor(s) 510, or the data store 515 can be operatively connected to the processor(s) 510 for use thereby. The term "operatively connected," as used throughout this description, can include direct or indirect connections, including connections without direct physical contact.

In one or more arrangements, the one or more data stores 515 can include map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry.

In one or more arrangements, the map data 516 can include one or more terrain maps 517. The terrain map(s) 517 can include information about the terrain, roads, surfaces, and/or other features of one or more geographic areas. The terrain map(s) 517 can include elevation data in the one or more geographic areas. The terrain map(s) 517 can define one or more ground surfaces, which can include paved roads, unpaved roads, land, and other things that define a ground surface.

In one or more arrangements, the map data 516 can include one or more static obstacle maps 518. The static obstacle map(s) 518 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 518 can have location data, size data, dimension data, material data, and/or other data associated with it. The static obstacle map(s) 518 can include measurements, dimensions, distances, and/or information for one or more static obstacles. The static obstacle map(s) 518 can be high quality and/or highly detailed. The static obstacle map(s) 518 can be updated to reflect changes within a mapped area.

The one or more data stores 515 can include sensor data 519. In this context, "sensor data" means any information about the sensors that the vehicle 500 is equipped with, including the capabilities and other information about such sensors. As will be explained below, the vehicle 500 can include the sensor system 520. The sensor data 519 can relate to one or more sensors of the sensor system 520. As an example, in one or more arrangements, the sensor data 519 can include information about one or more LIDAR sensors 524 of the sensor system 520.

In some instances, at least a portion of the map data 516 and/or the sensor data 519 can be located in one or more data stores 515 located onboard the vehicle 500. Alternatively, or in addition, at least a portion of the map data 516 and/or the sensor data 519 can be located in one or more data stores 515 that are located remotely from the vehicle 500.

As noted above, the vehicle 500 can include the sensor system 520. The sensor system 520 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 520 includes a plurality of sensors, the sensors may function independently or two or more of the sensors may function in combination. The sensor system 520 and/or the one or more sensors can be operatively connected to the processor(s) 510, the data store(s) 515, and/or another element of the vehicle 500. The sensor system 520 can produce observations about a portion of the environment of the vehicle 500 (e.g., nearby vehicles).

The sensor system 520 can include any suitable type of sensor. Various examples of different types of sensors will be described herein. However, it will be understood that the embodiments are not limited to the particular sensors described. The sensor system 520 can include one or more vehicle sensors 521. The vehicle sensor(s) 521 can detect information about the vehicle 500 itself. In one or more arrangements, the vehicle sensor(s) 521 can be configured to detect position and orientation changes of the vehicle 500, such as, for example, based on inertial acceleration. In one or more arrangements, the vehicle sensor(s) 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The vehicle sensor(s) 521 can be configured to detect one or more characteristics of the vehicle 500 and/or a manner in which the vehicle 500 is operating. In one or more arrangements, the vehicle sensor(s) 521 can include a speedometer to determine a current speed of the vehicle 500.

Alternatively, or in addition, the sensor system 520 can include one or more environment sensors 522 configured to acquire data about an environment surrounding the vehicle 500 in which the vehicle 500 is operating. "Surrounding environment data" includes data about the external environment in which the vehicle is located or one or more portions thereof. For example, the one or more environment sensors 522 can be configured to sense obstacles in at least a portion of the external environment of the vehicle 500 and/or data about such obstacles. Such obstacles may be stationary objects and/or dynamic objects. The one or more environment sensors 522 can be configured to detect other things in the external environment of the vehicle 500, such as, for example, lane markers, signs, traffic lights, traffic signs, lane lines, crosswalks, curbs proximate the vehicle 500, off-road objects, etc.

Various examples of sensors of the sensor system 520 will be described herein. The example sensors may be part of the one or more environment sensors 522 and/or the one or more vehicle sensors 521. However, it will be understood that the embodiments are not limited to the particular sensors described.

As an example, in one or more arrangements, the sensor system 520 can include one or more of: radar sensors 523, LIDAR sensors 524, sonar sensors 525, weather sensors, haptic sensors, locational sensors, and/or one or more cameras 526. In one or more arrangements, the one or more cameras 526 can be high dynamic range (HDR) cameras, stereo or infrared (IR) cameras.

The vehicle 500 can include an input system 530. An "input system" includes components or arrangement or groups thereof that enable various entities to enter data into a machine. The input system 530 can receive an input from a vehicle occupant. The vehicle 500 can include an output system 535. An "output system" includes one or more components that facilitate presenting data to a vehicle occupant.

The vehicle 500 can include one or more vehicle systems 540. Various examples of the one or more vehicle systems 540 are shown in FIG. 5. However, the vehicle 500 can include more, fewer, or different vehicle systems. It should be appreciated that although particular vehicle systems are separately defined, any of the systems or portions thereof may be otherwise combined or segregated via hardware and/or software within the vehicle 500. The vehicle 500 can include a propulsion system 541, a braking system 542, a steering system 543, a throttle system 544, a transmission system 545, a signaling system 546, and/or a navigation system 547. Any of these systems can include one or more devices, components, and/or a combination thereof, now known or later developed.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system or a geolocation system.

The processor(s) 510 or the automated or autonomous driving module(s) 560 can be operatively connected to communicate with the various vehicle systems 540 and/or individual components thereof. For example, the processor(s) 510 and/or the autonomous driving module(s) 560 can be in communication to send and/or receive information from the various vehicle systems 540 to control the movement of the vehicle 500. The processor(s) 510 or the autonomous driving module(s) 560 may control some or all of the vehicle systems 540 and, thus, may be partially or fully autonomous as defined by the society of automotive engineers (SAE) levels 0 to 5.

The processor(s) 510 and the autonomous driving module(s) 560 may be operable to control the navigation and maneuvering of the vehicle 500 by controlling one or more of the vehicle systems 540 and/or components thereof. For instance, when operating in an autonomous mode, the processor(s) 510 or the autonomous driving module(s) 560 can control the direction and/or speed of the vehicle 500. The processor(s) 510 or the autonomous driving module(s) 560 can cause the vehicle 500 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 500 can include one or more actuators 550. The actuators 550 can be an element or combination of elements operable to alter one or more of the vehicle systems 540 or components thereof responsive to receiving signals or other inputs from the processor(s) 510 or the autonomous driving module(s) 560. For instance, the one or more actuators 550 can include motors, pneumatic actuators, hydraulic pistons, relays, solenoids, and/or piezoelectric actuators, just to name a few possibilities.

The vehicle 500 can include one or more modules, at least some of which are described herein. The modules can be implemented as computer-readable program code that, when executed by a processor 510, implement one or more of the various processes described herein. One or more of the modules can be a component of the processor(s) 510, or one or more of the modules can be executed on and/or distributed among other processing systems to which the processor(s) 510 is operatively connected. The modules can include instructions (e.g., program logic) executable by one or more processor(s) 510. Alternatively, or in addition, one or more data store 515 may contain such instructions.

The vehicle 500 can include one or more autonomous driving modules 560. The autonomous driving module(s) 560 can be configured to receive data from the sensor system 520 and/or any other type of system capable of capturing information relating to the vehicle 500 and/or the external environment of the vehicle 500. In one or more arrangements, the autonomous driving module(s) 560 can use such data to generate one or more driving scene models. The autonomous driving module(s) 560 can determine position and velocity of the vehicle 500. The autonomous driving module(s) 560 can determine the location of obstacles, obstacles, or other environmental features including traffic signs, trees, shrubs, neighboring vehicles, pedestrians, etc.

The autonomous driving module(s) 560 can be configured to receive, and/or determine location information for obstacles within the external environment of the vehicle 500 for use by the processor(s) 510, and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The autonomous driving module(s) 560 can be configured to determine travel path(s), current autonomous driving maneuvers for the vehicle 500, future autonomous driving maneuvers and/or modifications to current autonomous driving maneuvers based on data acquired by the sensor system 520, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The autonomous driving module(s) 560 can be configured to implement determined driving maneuvers. The autonomous driving module(s) 560 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 560 can be configured to execute various vehicle functions and/or to transmit data to, receive data from, interact with, and/or control the vehicle 500 or one or more systems thereof (e.g., one or more of vehicle systems 540).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A, B, C, or any combination thereof (e.g., AB, AC, BC or ABC).

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. A camera system comprising:
a graded lens to receive light associated with a scene and resolve multiple angles of the light through a planarization reduction according to physical parameters of the graded lens, wherein the graded lens is substantially flat;
a detector that senses the light from the graded lens per pixel according to the physical parameters, and the physical parameters being at least partially distinct between neighboring pixels; and
the detector integrates multiple views of the scene into a patterned representation within a single image using the light to estimate depth associated with objects, wherein the single image includes aggregated data for views of the objects that overlap having resolved angles in association with the physical parameters.

2. The camera system of claim 1, wherein the single image includes a pattern of the views associated with the objects utilized for the depth.

3. The camera system of claim 1, wherein the graded lens is a metalens that filters per pixel to resolve the multiple angles of the scene.

4. The camera system of claim 1, wherein the physical parameters are associated with any one of refracting, filtering, and directing the light per pixel for the depth or a geometry of the graded lens.

5. The camera system of claim 1, further comprising:
a lens to filter the light from the graded lens by color for one or more pixels of the detector.

6. The camera system of claim 1, wherein the graded lens is a metasurface composed of a photonic band-gap crystal.

7. The camera system of claim 1, further comprising:
a processor that generates a spatial point distribution from the single image in association with the depth.

8. A camera system comprising:
a graded lens to receive lightwaves associated with a scene and resolve multiple angles of the lightwaves through a planarization reduction according to physical parameters of the graded lens, wherein the graded lens is substantially flat;
a detector array that senses the lightwaves from the graded lens per area according to the physical parameters, and the physical parameters being at least partially distinct between neighboring areas; and
the detector array combines multiple views of the scene into a patterned representation using the lightwaves to estimate depth associated with objects, wherein the combined multiple views include aggregated data for views of the objects that overlap having resolved angles in association with the physical parameters.

9. The camera system of claim 8, wherein the graded lens is a metalens that filters per area to resolve the multiple angles of the lightwaves.

10. The camera system of claim 8, wherein the physical parameters are associated with any one of refracting, filtering, and directing the lightwaves per area for the depth or a geometry of the graded lens.

11. The camera system of claim 8, further comprising:
a lens to filter the lightwaves from the graded lens by color for multiple areas of the detector array.

12. The camera system of claim 8, wherein the graded lens is a metasurface composed of a photonic band-gap crystal.

13. The camera system of claim 8, further comprising:
a processor that generates a spatial point distribution from the combined multiple views in association with the depth.

14. A camera system comprising:
a graded lens to receive light associated with a scene and resolve multiple angles of the light through a planarization reduction according to physical parameters of the graded lens, wherein the graded lens is substantially flat;
a pixel area that senses the light from the graded lens according to the physical parameters, and the physical parameters being at least partially distinct between neighboring regions within the pixel area; and
the pixel area integrates multiple views of the scene into a patterned representation within a single image using the light to estimate depth associated with objects, wherein the single image includes aggregated data for elements of the multiple views that overlap in association with the objects having resolved angles and the physical parameters.

15. The camera system of claim 14, wherein the single image includes a pattern of the multiple views utilized for the depth.

16. The camera system of claim 14, wherein the graded lens is a metalens that filters per area to resolve the multiple angles of the light.

17. The camera system of claim 14, wherein the physical parameters are associated with any one of refracting, filtering, and directing the light per area for the depth or a geometry of the graded lens.

18. The camera system of claim 14, further comprising:
a lens to filter the light from the graded lens by color for one or more pixels of the pixel area.

19. The camera system of claim 14, wherein the graded lens is a metasurface composed of a photonic band-gap crystal.

20. The camera system of claim 14, further comprising:
a processor that generates a spatial point distribution from the single image in association with the depth.

* * * * *